July 23, 1963
R. M. SHAVER
3,098,457
LADING ANCHOR CONSTRUCTION
Filed Sept. 21, 1955
2 Sheets-Sheet 1
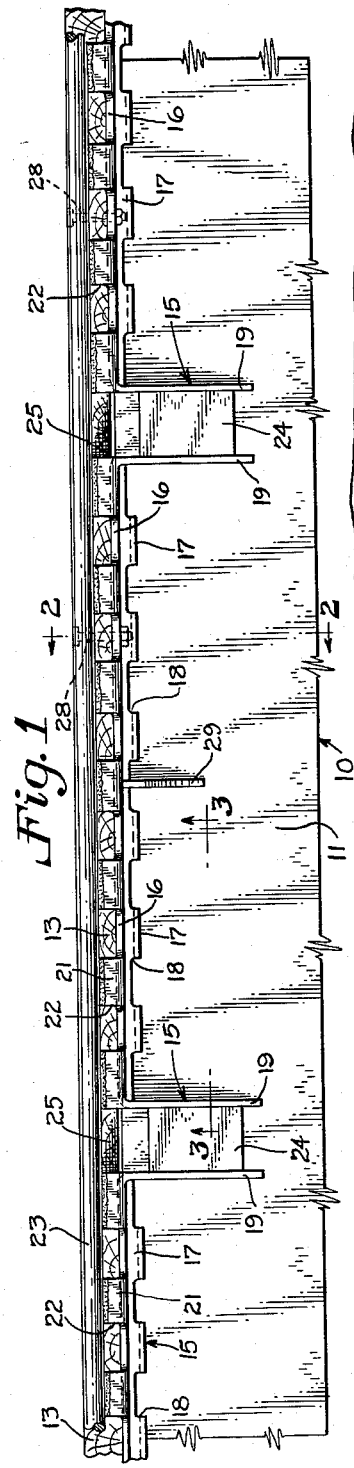
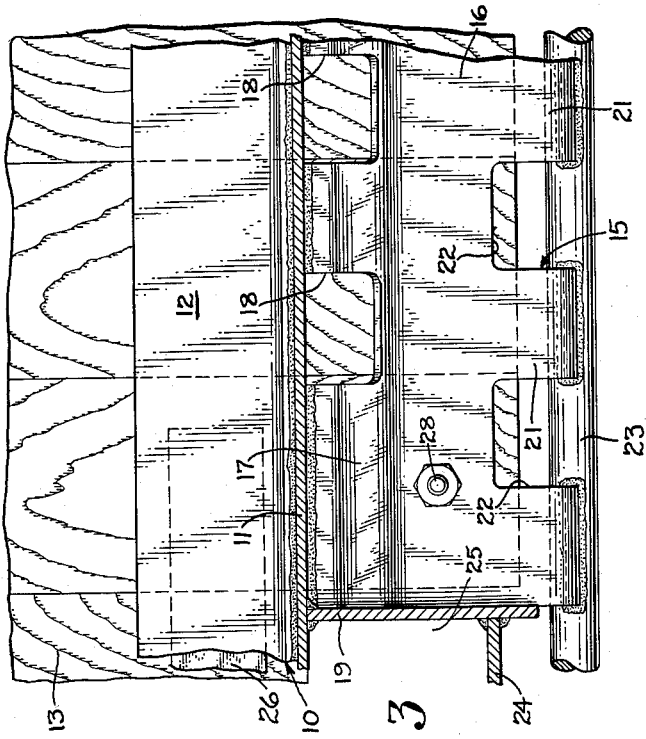
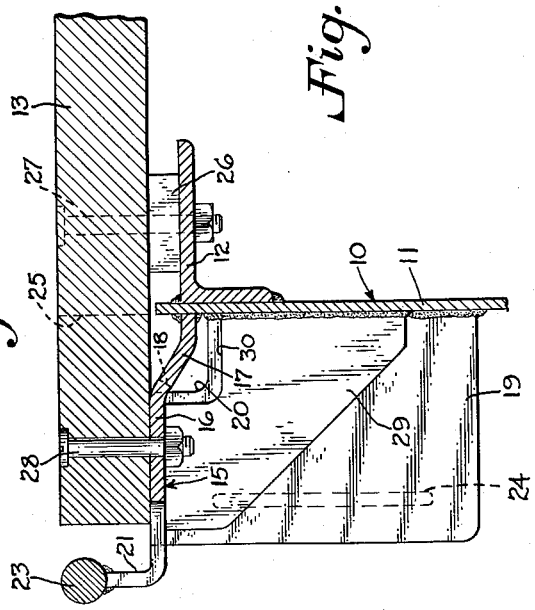
Inventor
Raymond M. Shaver
By Wayne Morris Russell,
Attorney July 23, 1963  R. M. SHAVER  3,098,457
LADING ANCHOR CONSTRUCTION
Filed Sept. 21, 1955  2 Sheets-Sheet 2
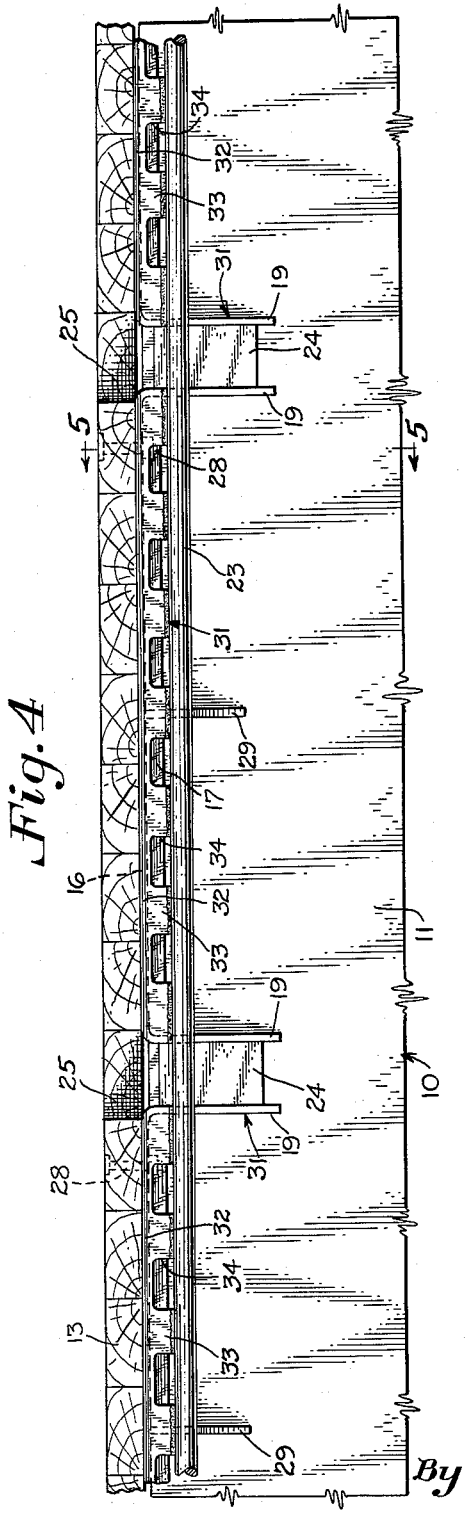
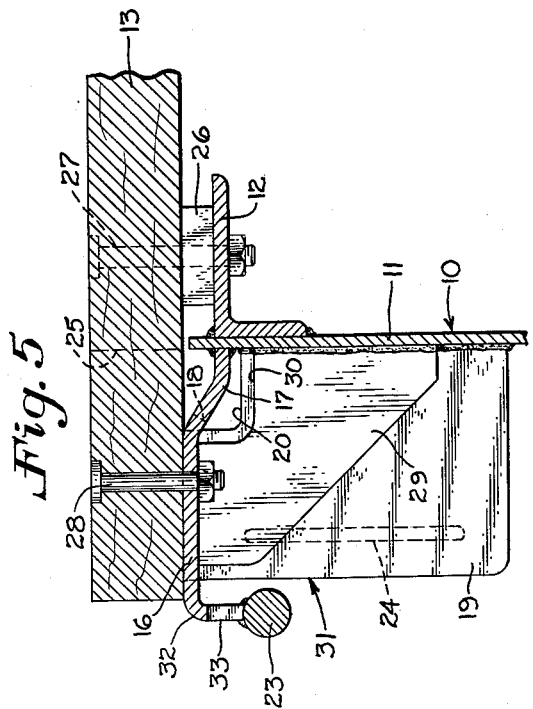
Inventor
Raymond M. Shaver
By Wayne Morris Russell
Attorney 3,098,457
LADING ANCHOR CONSTRUCTION
Raymond M. Shaver, Michigan City, Ind., assignor to Pullman Incorporated, a corporation of Delaware
Filed Sept. 21, 1955, Ser. No. 535,725
4 Claims. (Cl. 105—404)

This invention relates generally to open, flat-bottomed freight vehicles, such as railway flat cars, and more particularly to such vehicles having lading-securing means.

It is an object of the invention to provide permanent lading anchor means integrated with a railway flat car or like freight vehicle.

Another object is the provision of continuous horizontal members integrally secured to a flat car or similar vehicle along the sides thereof providing longitudinally spaced openings for attachment of lading bands.

Another object is the provision of a combined floor support, stake pocket, and lading anchor member for a freight vehicle.

Another object is the provision of a combined floor support and lading anchor construction in a freight vehicle such as a flat car.

A further object is the provision of a combined stake pocket and lading anchor construction in a flat car or like freight vehicle.

It is another object to provide a construction in which floor supporting means for a flat car or like vehicle are utilized to form a lading band anchor.

A further object is the provision of a combined floor support, lading anchor, and stake pocket construction in a flat car or similar vehicle.

The foregoing and other objects of the invention are attained by the construction described in the following specification and shown in the accompanying drawings, in which:

FIG. 1 is a side elevational view of a portion of a freight vehicle embodying the invention;

FIG. 2 is an enlarged vertical sectional view taken substantially as indicated by the line 2—2 in FIG. 1;

FIG. 3 is an enlarged bottom plan view of a portion of the structure of FIG. 1, taken substantially as indicated by the line 3—3 in FIG. 1;

FIG. 4 is a view similar to FIG. 1 but showing another form of the invention; and FIG. 5 is an enlarged vertical sectional view taken substantially as indicated by the line 5—5 in FIG. 4.

Referring to the drawings, and particularly to FIGS. 1 to 3 inclusive, the invention is shown as incorporated in a flat, open freight vehicle, in this instance taken as a railway flat car. The car comprises an underframe of any suitable construction and including a side sill 10, which may be a channel or other suitable member but is shown as formed of a vertical longitudinally extending plate 11 which has welded to its inner face adjacent the upper edge a longitudinally extending angle member 12, one flange of which extends horizontally. A similar angle or other member, not shown, may be provided along the lower edge of the plate 11. A floor 13 extends over the underframe and projects laterally beyond the side sill at each side. The floor is shown as comprising wooden boards, but may be of any suitable material.

A plurality of combined floor support, stake pocket, and lading anchor members 15 are secured in horizontally aligned, longitudinally spaced relation along each side of the vehicle. Each of these combined members is formed preferably of a single flange or plate to provide a horizontal support portion 16 disposed under the portion of the floor 13 projecting outwardly of the side sill, with an inner marginal portion 17 depressed or downwardly inclined somewhat to abut the plate 11 below the upper edge thereof. The edge of the portion 17 is welded to the plate 11, its downward offset providing for a strong welded connection and facilitating the welding operation. A number of indentations or notches 18 are formed in the edge of the depressed portion 17 to provide drainage openings preventing accumulation of water or other foreign matter in the depression which might lead to rapid corrosion. The end portions 19 of the plate forming the member 15 are bent to extend downwardly from the horizontal support portion 16, their inner edges being welded to the side sill plate 11. The upper inner corners of these depending end portions 19 are cut away or coped as at 20 to permit of the bending of the portion 17 and to allow for the weld between the lower face of that portion and the plate 11. Integral with the support portion 16 is a lading anchor portion provided by a series of tongues 21 forming a serrated edge. The tongues extend laterally outward from the portion 16 beyond the edge of the floor 13 with their ends bent upwardly in spaced relation to the floor, and define between them a plurality of indentations or notches 22. As shown in FIG. 3, the notches 22 are preferably offset relative to the notches 18. A lading band anchor rod or bar 23 extends along the serrated edge of the plate and is welded to the edges of the tongues 21, thus forming with the notches 22 a series of lading band openings by means of which lading bands or other means for securing lading on the vehicle may be anchored to the bar 23. The anchor bar, which may be formed of a plurality of sections of convenient length, extends for substantially the full length of the car, bridging the spaces between the combined members 15, and thus providing lading band openings between the members as well as along the edges thereof. The anchor bar 23 extends substantially to the level of the upper surface of the flooring, thus protecting the edge of the floor against damage. Instead of employing an anchor bar made integral with the anchor portion of the combined member by the welds to form the lading band openings, a series of apertures may be formed adjacent the side edge of the member with an integral edge portion, which may be rounded or beaded if desired, left to serve as an anchor means to which lading bands may be secured. In such case, the integral edge portions may be extended longitudinally to bridge the spaces between the combined members.

The depending end portions 19 form walls of a number of stake pockets provided along the side sill, one end portion 19 of a member 15 defining one wall of a stake pocket and the portion 19 at the adjacent end of a member 15 adjacent the first forming the opposite wall of the same pocket. The spacing of the members 15 corresponds to the width of the pockets. A web plate 24 substantially parallel to the side sill plate 11 extends between and is welded to the depending portions 19 of each pair of such portions defining opposed walls of a stake pocket, each pocket thus being defined by a pair of adjacent depending portions 19, the plate 11, and a web plate 24. The portions 19 also serve as braces or gusset plates for the other portions of the members 15, as will be obvious. The plate 24 may be employed as a lading band anchor when the stake pocket is empty, if desired and for this purpose the top and bottom edges of the plate are smoothly rounded. An opening or recess is provided above each pocket as indicated at 25 by cutting away or otherwise suitably forming the flooring 13, to allow insertion of a stake in the pocket. Since the flooring at the stake pockets cannot be supported on the portions 16 of the members 15, a suitable filler 26 is disposed between the floor and the horizontal flange of the angle member 12 adjacent each opening 25, so that the flooring is supported by the angle member. A bolt 27 secures the flooring to the angle member. The outer marginal portion of the flooring 13 is secured to the support portions 16 of the combined members 15 by bolts 28, only some of which are shown, or other suitable means.

For greater strength and rigidity, vertical gusset plates 29 are provided for the members 15 at intervals between the stake pockets, disposed substantially perpendicular to the support portion 16 and plate 11 and welded thereto. Each gusset has a cutout or cope 30 at its upper inner corner similar to the cope 20 of the depending end portion 19, allowing for the welding of the depressed portion 17 to the side sill and avoiding any need to shape the upper edge of the gusset plate to the depressed portion.

Another embodiment of the invention is illustrated in FIGS. 4 and 5, differing from that shown in FIGS. 1 to 3 primarily in the lading band anchor arrangement. As shown in FIGS. 4 and 5, the invention employs combined floor support, stake pocket, and lading band anchor members 31 largely identical to the members 15 previously described. Those portions of the members 31 substantially identical to parts of the members 15 are designated by the same reference characters, as are corresponding parts of the structures aside from the combined members. The members 31 are secured in longitudinally spaced relation along the side sill 10 by welding of the inner edges of the depressed portions 17 and depending end portions 19 to the plate 11, with the horizontal support portions 16 thereof underlying the projecting portion of the flooring 13, which is secured to the portions 16 by the bolts 28. The adjacent depending portions 19 of adjacent members 31 form opposed sides or walls of stake pockets completed by plates 24, as in the case of the members 15, and recesses or openings 25 are provided in the flooring over the stake pockets, with the flooring supported inwardly of the openings by the spacers or fillers 26 and secured to the angle member 12 by bolts 27. The depressed portions 17 are formed with the drainage notches 18, and the end portions 19 are coped as at 20. Integral with the outer margin of the floor support portion 16 of each member 31 is an anchor portion 32 extending outwardly of the floor edge and bent downwardly, having a serrated edge defined by alternate tongues 33 and notches 34. An anchor bar 23 as previously described extends along the serrated edges of the anchor portions of the several members 31 and across the spaces between the members, and is welded to the edges of the tongues 33, defining lading band openings with the notches 34 and between the terminal tongues 33 of adjacent members 31 adjacent the stake pockets. Gusset plates 29 with copes 30 are provided as in the case of the construction of FIGS. 1 to 3 to brace the structure. The anchor bar 23 and anchor portions of the combined members 31 do not protect the edge of the floor in this construction, but the downwardly extending anchor portions 32 and tongues 33 provide great resistance to upward deflection of the anchor bar 23 by stresses imposed by the lading. The spacing of the anchor bar below the level of the flooring 13 also provides for more ready securement of lading which may project outwardly of the floor.

The combined members 15 and 31 of the two embodiments of the invention disclosed herein support the latterally projecting portion of the floor, form stake pockets, and provide for anchoring of lading-securing devices, the invention providing a lading band anchor structure extending continuously along substantially the entire length of a vehicle such as a flat car, the anchor means comprising serrated edge portions of the combined members.

What is claimed is:

1. In a freight vehicle, an underframe structure including a longitudinal side sill having a vertical web portion and a horizontal inwardly directed top flange, a lading anchoring and floor supporting member comprising a generally horizontal plate having its inner edge welded to the upper zone of the vertical web portion of the side sill and extending outwardly therefrom in substantially the plane of said top flange thereof, said member having a notch formed in its outer edge, floor boards overlying the side sill and extending over the member in supported relation to the member and having their outer ends spaced from the outer edge of the member, an anchor element secured to the member in outwardly spaced relation to the inner end of the notch therein and opposite to and spaced outwardly from the outer end of the adjacent floor board to close the notch and thereby form an enclosed opening for receiving an anchor band, the end portions of said member being downwardly directed and being spaced longitudinally of the vehicle from the downwardly directed end portion of a next adjacent identical member and having their inner edges welded to the vertical web portion of the side sill to rigidify the member and its connection to the side sill and cooperate with the side sill in forming three of the four walls of a stake pocket, a vertical plate spaced outwardly from and parallel to the vertical web portion of the side sill and connecting said end portions of the two adjacent members to form the fourth wall of said stake pocket, and additional rigidifying means comprising a brace intermediate the downwardly directed end portions of each member welded to the under surface of the member and the outer surface of the vertical web portion of the sill.

2. A freight vehicle as claimed in claim 1, in which the outer edge portion of each of the lading anchoring and floor supporting members is bent out of the plane of the remainder of the member and comprises a vertical portion of the member, with the anchor element welded to the edge of said vertical portion.

3. A freight vehicle as claimed in claim 1, in which the outer edge portion of each of the lading anchoring and floor supporting members is bent upwardly out of the plane of the remainder of the member and comprises a vertical portion of the member, with the anchor element welded to the edge of said vertical portion.

4. A freight vehicle as claimed in claim 1, in which the outer edge portion of each of the lading anchoring and floor supporting members is bent downwardly out of the plane of the remainder of the member and comprises a vertical portion of the member, with the anchor element welded to the edge of said vertical portion.

References Cited in the file of this patent

UNITED STATES PATENTS

| | | |
|---|---|---|
| 2,520,554 | Logmann et al. | Aug. 29, 1950 |
| 2,583,257 | Dietrichson | Jan. 22, 1952 |
| 2,613,614 | Goodwin | Oct. 14, 1952 |
| 2,640,442 | Johnsen | June 2, 1953 |
| 2,709,972 | Ingram | June 7, 1955 |
| 2,755,747 | Oakley | July 24, 1956 |
| 2,765,754 | Adler | Oct. 9, 1956 |
| 2,767,663 | Ingram | Oct. 23, 1956 |
| 2,867,178 | Adler | Jan. 6, 1959 |
| 2,868,140 | Shaver | Jan. 13, 1959 |